United States Patent [19]

Worden

[11] 4,011,130

[45] Mar. 8, 1977

[54] LEATHER-LIKE WATERLAID SHEETS CONTAINING PARTICULATE FILLERS

[75] Inventor: Robert A. Worden, St. Paul, Minn.

[73] Assignee: Minnesota Mining and Manufacturing Company, St. Paul, Minn.

[22] Filed: Sept. 9, 1974

[21] Appl. No.: 504,237

[52] U.S. Cl. .............................. 162/151; 162/155; 162/157 C; 162/164 R; 162/175; 162/176; 162/181 R; 162/206; 162/207; 428/904

[51] Int. Cl.$^2$ ..................... D21H 3/48; D21H 5/12

[58] Field of Search .......... 162/168, 150, 142, 144, 162/151, 158, 175, 155, 157 R, 157 C, 181 R, 176, 206, 207; 428/904

[56] References Cited

UNITED STATES PATENTS

| | | | |
|---|---|---|---|
| 3,001,907 | 9/1961 | Bergstrom | 162/175 |
| 3,436,303 | 4/1969 | Raymond et al. | 162/123 |
| 3,658,638 | 4/1972 | Ludwig et al. | 260/17.5 |
| 3,756,909 | 9/1973 | Stepan et al. | 162/151 |

FOREIGN PATENTS OR APPLICATIONS 787,649   6/1968   Canada

OTHER PUBLICATIONS

Casey, J. P., "Pulp & Paper" vol. II, Sec. Ed. Interscience Publishers, Inc., N.Y., N.Y., 1960, pp. 985–986. "Fillers for Plastic," Iliffe Books, London, 1971, pp. 81–91.

*Primary Examiner*—S. Leon Bashore
*Assistant Examiner*—William F. Smith
*Attorney, Agent, or Firm*—Cruzan Alexander; Donald M. Sell; Warren R. Bovee

[57] ABSTRACT

Waterlaid sheets comprising essential solids consisting of (I) elastomeric binder, and (II) nonelastomeric solids comprising inflexible, non-fibrous, rounded, particulate fillers and a fibrous reinforcing component. The waterlaid sheets are useful as substitutes for leather in the manufacture of footwear, particularly as the outsole or insole portion of a shoe.

26 Claims, No Drawings

LEATHER-LIKE WATERLAID SHEETS CONTAINING PARTICULATE FILLERS

The present invention relates to flexible, synthetic, waterlaid sheets useful as substitutes for leather and compositions and methods useful in their preparation. An aspect of the invention relates to leather-like waterlaid sheets comprising essential solids consisting of (I) elastomeric binder and (II) nonelastomeric solids comprising (a) inflexible, nonfibrous, rounded, particulate fillers and (b) reinforcing fibers. A further aspect of the invention relates to waterlaid sheets prepared from an aqueous furnish or slurry comprising essential solids consisting of (I) elastomeric latex particles and (II) nonelastomeric solids comprising (a) inflexible, nonfibrous particulate fillers and (b) reinforcing fibers, the aqueous slurry being deposited on an appropriate forming surface and dried to provide leather-like sheets useful in the manufacture of footwear and other leather-like articles.

The demand for leather-like products is currently greater than the supply of leather materials. The need for an acceptable synthetic substitute for leather has spawned the development of various techniques for preparing synthetic leather products having uniform, reproducible properties similar or superior to those of natural leather. Previous methods of preparing synthetic leather have employed papermaking technology wherein a waterlaid sheet comprising leather fibers and a polymeric binder is formed on a papermaking screen and subsequently dried (see, for example, a U.S. Pat. No. 3,436,303). Synthetic leather products have also been made wherein a portion of the leather fibers normally used in preparing the synthetic leather sheets are replaced by wood flour to achieve processing characteristics not obtainable without the use of wood flour (U.S. Pat. No. 3,756,909). While the previously known synthetic leather products have been found acceptable for a variety of uses, particularly for the manufacture of footwear, it has been difficult to obtain the desired balance of properties possessed by natural leather. Most notably, physical properties such as flexibility and dimensional stability, as well as leather-like drape, hand, and break (for upper material) are difficult to achieve in combination with processing properties such as stitchability, acceptance of surface finishing and, particularly, acceptable edge trimming for outsole material.

The present invention provides a leather substitute which comprises a flexible, waterlaid sheet comprising essential solids consisting essentially of (I) elastomeric binder and (II) nonelastomeric solids comprising (a) particulate fillers and (b) reinforcing fibers, wherein the particulate fillers comprise at least 10 percent by weight of the essential solids, preferably 10 to 60 percent by weight.

In the present invention, the particulate fillers which comprise the essential solids are inflexible, non-fibrous, rounded, particulate fillers having an average particle size in the range of 1 to 160 microns. The particles are generally rounded particles which may be irregular, chunky particles or may be generally spheroidal in shape; however, in whatever form the particulate filler may exist, the length of any major axis of the particles should not be more than twice the length of any of the other axes. Thus needle-like, platelet, or fibrous particles are not included among the particulate fillers useful as essential solids in the present invention. Due to their configuration and physical properties, these particulate fillers impart a unique balance of properties to the waterlaid sheets which render the sheets especially suitable as leather substitutes particularly for the manufacture of footwear.

In addition to the particulate filler, the essential solids comprise at least 5 percent by weight fibrous reinforcing component, and preferably about 5 to 50 percent by weight. The remainder of the essential solids comprises sufficient elastomeric binder to provide an integral, cohesive sheet. Generally the binder comprises about 15 to 80 percent by weight of the essential solids.

Other materials in addition to the essential solids can be included to extend, fill, color or otherwise modify the properties of the waterlaid sheet and can be added in amounts which do not adversely affect the leather-like properties of the sheets. Preferably the nonessential solids are present in minor amounts usually ranging up to about 25 percent by weight based on the combined essential and nonessential solids. Thus fillers such as wood flour, leather dust and the like can be added in minor amounts along with conventional pigments, dyes and the like to provide the leather-like products of the present invention.

The waterlaid sheets of the present invention are prepared from aqueous dispersions or slurries of the essential and nonessential solids dispersed in water as will be described in greater detail hereinafter. The slurry or dispersion (also referred to in the papermaking art as the "furnish") is deposited on a supporting surface and the liquid removed to form a dry, coherent sheet. The resulting sheets can be used for insole or outsole material or can be further densified by pressing under relatively low pressure, e.g. as little as 20 psi or less, to provide a dense outsole which compares favorably to conventional leather outsoles. The particulate fillers used in the present invention provide waterlaid sheets suitable for insoles and having improved flexibility, break, and resistance to wet spread compared to the prior art synthetic leather sheets. The thicker, dense outsole materials of this invention exhibit improved flexibility, sole laying, edge trimming, heel scouring, appearance and surface finishing without any sacrifice in the physical properties possessed by previously known synthetic leather sheets. A further advantage of using the particulate fillers as disclosed herein is that a leather-like sheet can be prepared which is a satisfactory substitute for leather-containing sheets, but which is completely free of any leather component as will be more fully described hereinafter.

The significant improvement in leather-like properties resulting from the incorporation of the particulate fillers in the sheets of the present invention is surprising in view of the fibrous nature of natural leather and the use of natural leather fibers and other fibrous materials in prior art synthetic leather products. The ability to provide a leather-like sheet free of natural leather in fiber form is also surprising and can provide an economic advantage over prior art synthetic leather outsole materials which have required significant amounts of leather to provide leather-like properties (e.g. U.S. Pat. No. 3,436,303). Further, low density synthetic leather sheets can now be provided which are useful as insole material and which exhibit a surprising ability to absorb moisture with low attendant "wet spread" and which also conform to the shape of the foot without the sacrifice of foot comfort factors which is associated with known fiberboard insole products such as breaking or "piping" where the insole is sharply bent.

The synthetic leather sheets of the present invention can be prepared by any process which will provide a uniform, coherent blend of elastomer, particulate filler, and reinforcing fiber and which will provide for intimate contact and bonding between the elastomer and the materials distributed throughout the elastomeric binder. It has been found most suitable to prepare an aqueous dispersion of the components, flow the dispersion onto a support to form a pond of a depth sufficient to provide the desired sheet thickness, and then remove the water such as by draining, pressing, evaporating or the like. Prior art techniques are known which will provide the desired product such as the waterlaid sheet techniques used in the paper industry and for making synthetic leather sheets as taught by the aforementioned U.S. Pat. Nos. 3,346,303 and 3,756,909. Synthetic leather sheets suitable for use as outsole or insole material can be readily provided by simply altering the relative amounts of elastomeric binder, particulate filler, and fiber reinforcing material used in the starting materials as will be discussed hereinafter.

The waterlaid leather-like sheets of the present invention comprise essential solids consisting of elastomeric binder, particulate filler having an average particle diameter in the range of 1 to 160 microns, and fibrous reinforcing component. Optionally, non-essential additives such as fillers, dyes, extenders, preservatives, and the like can be added. Preferably the essential solids consist of 15 to 80 percent by weight binder, 10 to 60 percent by weight particulate filler, and 5 to 50 percent by weight fibrous reinforcing component. The unique properties of the leather-like sheets of the present invention result from the use of at least 10 percent by weight (based on the total weight of the essential solids) of a selected particulate filler.

The selected particulate fillers useful in the present invention are organic or inorganic materials which are resistant enough to retain their particulate shape in the final leather-like product. The particulate fillers are inflexible, nonfibrous rounded particles as described previously having an average particle size in the range of 1 to 160 microns, preferably in the range of about 2 to about 50 microns. The specific gravity of the particles should be such as to allow the particles to remain uniformly dispersed in the aqueous dispersions used in preparing the sheets. Generally, a specific gravity of about 0.2 to about 3 has been found satisfactory in most formulations, with a range of about 0.5 to about 2 being preferred.

As noted, the particulate fillers can be organic or inorganic, or mixtures of both can be used. A preferred class of organic fillers are the vegetable shell flours, particularly those flours prepared from the hard portions of plant shells and seeds. For a description and definition of vegetable shell flours, see Wake, W. C., "Fillers for Plastics," Iliffe Books, London (1971) pp. 85 and 86. Vegetable flours prepared from pecan shells, walnut shells, coconut shells, peach pits, apricot pits, and cherry pits and the like are suitable. The utility of these vegetable shell flours in the present invention is believed attributable to the chemical modifications of the basic woody structure which have occurred to form the relatively dense shells and pits. Typical analyses of hard nutshells reveal a composition having about 59 to 60 percent cellulose, 32 to 34 percent lignin resin, 5 to 6 percent cutin wax, and 8 to 9 percent pentosans. The high content of lignin resin and cutin wax is believed to render the filler resistant to water absorption. In addition, these shell flours are near optimum density for the preparation of leather-like sheets for footwear and generally have a strong anionic charge which can aid the bonding between the elastomeric binder and the shell flour and result in improved internal bond strength in the sheet.

The original vegetable shell or fruit pit is itself a fairly dense, non-fibrous mass and when properly ground to flour yields chunky, rounded particles which are nonfibrous in form. Microscopic examination of nutshell flour shows a porous structure full of intercommunicating channels which in the present invention may allow the absorption of the elastomeric binder resin, further improving internal bond strength in the synthetic leather sheets. Softer vegetable shell flours such as almond shells and vegetable flours prepared from corn cobs and tree bark can be useful as particulate fillers, but are not as good as the hard vegetable shell flours since these softer materials are not as easily ground to uniform particulate form, and sheets made with these vegetable flours generally exhibit somewhat reduced flexibility.

Other organic and inorganic particulate fillers which meet the above requirements with respect to particle size and shape and specific gravity may also be used. Spheroidal fillers such as hollow or solid glass microspheres, e.g., B40-BX glass microspheres, 3M Company, or organic or inorganic microvoids (hollow or solid spheroidal particles) such as are available commercially from N. L. Industries as "D-1" microvoids (hollow polymethyl methacrylate microspheres); "D-6" microvoids (hollow silica-titanium dioxide microspheres); and "D-7" microvoids (hollow silica-amino resin microspheres).

Starch particles which are cold-water-insoluble ungelatinized starch particles or granules from a vegetable source are also useful. A preferred particulate starch filler is potato starch such as that available commercially as Crown Modified Potato Starch No. 180, Penick and Ford, Ltd.

In order to effectively enhance the properties of the waterlaid leather-like sheets, the particulate fillers should be present in amounts ranging from about 10 to 60 percent by weight of the essential solids. For outsole material, the preferred range is about 15 to 50 percent by weight of the essential solids, whereas for insole formulations the preferred range is from about 20 to 50 percent by weight of the essential solids. The fine texture of formulations containing the above amounts of particulate fillers provides a product having a smooth surface after pressing and/or sanding and which is receptive to known commercial factory finishing processes to provide a surface having a high quality leather-like appearance. The leather-like outsole material can be processed much like conventional leather and does not exhibit the disadvantage of heat buildup or knife dulling during cutting or edge trimming with conventional rotating knives as do many of the prior art synthetic leathers. In addition the use of substantial amounts of particulate fillers provides a product having greater flexibility than prior art products employing major amounts of fibrous reinforcing materials.

The binders useful in preparing the leather-like sheets of the present invention can be any elastomeric material which can be intimately associated with and reinforced by the particulate fillers and fibrous reinforcing materials. The term "elastomer" is used herein in the conventional sense to refer to a material which can be elongated to at least 100 percent of its length and return with force to substantially its original length. Since the sheets of the present invention are generally prepared by depositing an aqueous dispersion, the elastomeric binders should be capable of existing in an aqueous dispersion or latex form for convenience.

Examples of useful elastomeric latices are the polyurethanes (including polyureas and polyurea urethanes), Neoprene, butadiene copolymers as with styrene or acrylonitrile, polyacrylates and the like. The amounts of shell flour and fiber reinforcing materials may be varied within the limits noted above when formulating polymeric sheets from the various polymers in order to achieve maximum benefit from the particular physical characteristics of the various polymers. The elastomers should be resistant to creep or flow at ambient temperatures. They generally have been found to have a brittle temperature of about −10° C. or lower and preferably −30° C. or lower. The heat distortion temperature (as per ASTM D 1637-61) should be at least 40° C. or preferably at least 75° C. The elastomer should have a tensile strength at break of at least 300 psi (21 kg/cm$^2$), more preferably at least 750 psi (53 kg/cm$^2$), and should have an elongation at break of at least 100 percent, preferably at least 500 percent. The modulus (stress at 100 percent elongation) should be between 50 psi (3.5 kg/cm$^2$) and 1000 psi (70 kg/cm$^2$). These properties can be measured on the polymer as isolated and formed in any suitable manner into a coherent shape such as a film, and the resulting form, e.g. cast film, may be heated or hot pressed prior to testing to ensure the effective removal of solvent, etc. However, it should be understood that the above properties are merely illustrative of those displayed by elastomeric polymers useful in the practice of the invention. For example, the properties may be altered by the presence of residual amounts of emulsifying agents, incomplete solvent removal, additional heat curing occurring during or after film formation, physical working of the film, or the presence of moisture. Therefore, the above values are representative of the properties measured on samples of the preferred elastomeric polymers. Test films should be prepared by using conditions as similar as practically possible to those encounterred in manufacturing the sheets of the present invention.

A class of aqueous dispersions found useful in the present invention are the polyurethane latices. As used herein, the term "polyurethane" is intended to refer generically to polymers containing urethane linkages, urea linkages (polyureas) or mixtures thereof (polyurethaneurea) unless otherwise indicated. The preferred latices contain elastomeric polyurethane latex solids in the form of discrete globular particles less than about 25 microns average particle size such as disclosed in U.S. Pat. No. 3,436,303. Preferably the latex particles are in the size range of 0.1 to 10 microns in size and most preferably 0.1 to 5 microns. Even though such particles may tend to agglomerate, the individual particles are readily identifiable as falling within the above-mentioned size ranges. The latex solids can be nonionic or can be anionic, or cationic, by virtue of comprising negatively or positively charged polymer molecules. Alternatively, the latex particles can be emulsified with an anionic or cationic surfactant. The charge of the preferred latex particles apparently assists in maintaining the dispersion through formation of phase relationships characteristic of oil-in-water emulsions.

The preferred polyurethane latices are those of the self-emulsifiable type containing no external emulsifying agents and preferably made with little or no organic solvent present. The polyurethane particles are preferably formed from latices based on polyether urethane or urethaneurea elastomers. Other urethane elastomers, for example, polyester urethanes having the previously specified minimum physical properties are also useful. Examples of suitable polyurethane latices are those disclosed in U.S. Pat. No. 2,968,575 issued Jan. 17, 1961 ((Mallonee), and British Patent No. 880,665, issued Oct. 25, 1961. The preferred polyurethanes are the self-emulsified anionic or cationic latices wherein a carboxylic acid anion, a sulfonate, sulfate, phosphonate, phosphate, amine, or the like is part of or substituted on the polymer molecule. See U.S. Pat. Nos. 3,539,483 (Keberle et al), issued Nov., 1970, 3,479,310 (Dieterich et al), issued Nov., 1969, and U.S. Pat. No. 3,826,769 (Carlson) issued July 30, 1974, for examples of self-emulsified anionic and cationic latices of the polyurethane type.

The molecular weight of the polyols used in preparing the polymer, the crosslink density (if any), amount of aromatic content (if any), concentration of urea and/or urethane linkages, etc. of the polyurethane latex solids is selected such that the solids are elastomeric as defined previously. Elastomeric polyurethane polymers suitable for use in this invention have a molecular weight greater than 10,000 and form films with the following physical properties: (tested free of fillers and the like at 23° C. and 50 percent relative humidity) a tensile strength of at least 300 psi (21.1 kg/cm$^2$) preferably at least 750 psi (52.8 kg/cm$^2$), a stress at 100 percent elongation of at least 50 psi (3.5 kg/cm$^2$), preferably at least 150 psi (10.5 kg/cm$^2$), and an elongation at break of at least 100 percent, preferably at least 500 percent. To avoid undue stiffness the stress at 100 percent elongation should not exceed 1,000 psi (70 kg/cm$^2$). To avoid undue rubberiness the elongation at break should not exceed 1500 percent.

By following the teachings of the self-emulsified polyurethane latex art, latices comprising particles less than a few microns in size can readily be provided. It is difficult however, even with special mixing or homogenizing equipment, to reduce all of the particles to the colloidal size range. This presents no serious problem, however, since charged polyurethane latex particles larger than 0.1 micron in size form stable oil-in-water emulsions. Uncharged polyurethane particles in this size range can be stably emulsified with the use of suitable surfactants. In any event, the latices used in the present invention serve as binders for the shell flour and other solids.

The third component of the essential solids of the present leather-like sheets is the fibrous reinforcing component, i.e., fibers which improve the tensile and tear strength of the leather-like sheet. The reinforcing fibers found useful in the present invention can be leather fibers, wood fibers, or other natural or snythetic staple fibers. The leather fibers preferred for use in the present invention are leather fibers of papermaking length, typically preferred are leather fibers ranging in length from 0.1 to about 4 millimeters. The leather fibers can be obtained from leather scrap comminuted to the desired fiber length and can be obtained from chrome tanned or vegetable tanned leather or mixtures thereof as well as from chrome or vegetable retanned leather. Shorter fibers such as beater-refined leather fibers can also be used and generally result in a smoother sheet surface.

The wood fibers preferred for use herein are the chemical wood fibers such as those prepared by the sulfate (Kraft) cooking process and which are commercially available under the tradename "Mersanier J," Rayonier ITT, Inc., and "Dryden" Kraft, Montmorency Paper Co. Fiber length is important when reinforcement is the desired result. A high aspect ratio (length to diameter ratio) is desirable consistent with the formation characteristics of the particular fiber. The fibers are generally prepared from soft woods such as Southern U.S. white pine, black spruce, jackpine, Douglas fir and the like. Useful soft wood sulfate fibers vary in average length from about 2.9 to 6.3 mm and have an average diameter of about 0.03 mm. Hardwoods, on the other hand, yield fibers having an average length of about 0.8 to 1.8 mm and have an average fiber diameter of about 0.02 mm. Therefore, the softwood fibers having a greater average aspect ratio or L/D ratio are preferred. It is preferred to use chemical wood fibers in the range of 3.5 to 5.5 mm in length. Best results are obtained with fibers which are unbeaten or only slightly beaten and which have a freeness of not over 30° SR (Schopper-Reigler freeness test) or not less than 425 cc Canadian Standard.

Other fibers such as cotton linter pulp fibers such as commercially available "Grade 225-UL," Alpha Cellulose Corp., have an average length of about 10 mm. and can be used to reinforce the waterlaid leather-like sheets of this invention. Polyamide, e.g. nylon fibers can be used as well as other fibers of wholly synthetic polymers such as polypropylene, polyesters, e.g. polyethylene terephthalate and acetal copolymers (e.g. those based on trioxane). By "wholly synthetic polymer" as the term is used herein is meant polymeric material synthesized by man as distinguished from polymeric products of nature or derivatives thereof. Other fibers such as rayon, glass, asbestos, and the like may be used to vary the physical properties of the sheet. The staple fibers preferably are in the size range of from 1 to 6 denier and range in length from ⅛ to ½ inch (0.3 cm to 1.3 cm), ¼ to ⅜ inch (0.6 cm to 1 cm) being preferred.

As has been noted previously, the waterlaid leather-like sheets may be selectively formulated to provide insole or outsole materials. When tough, dense outsole materials are desired, the weight ratio of elastomeric solids to nonelastomeric solids generally ranges from about 0.8:1 to 3:1, while for the less dense insole materials, less polymer is needed and the weight ratio generally ranges from about 1:3 to 1:1. Depending on the particular elastomers, fillers and fibers employed, sheets ranging in density from about 0.5 to 1.2 g/cm³ can be prepared. Preferably, outsole material has a density in the range of 0.8 to 1.1 g/cm³, whereas insole material will desirably range from 0.6 to 0.95 g/cm³.

In addition to the essential solids in the synthetic leather sheets of this invention, minor amounts, generally up to about 25 percent based on the total formulation weight, of optional, non-essential additives can be added with advantage. For example, other fillers, such as wood flour, leather dust, dyes, pigments, fibrids and the like can be added to modify the physical or esthetic properties of the sheets. Wood flour is a particularly preferred additive due to low cost and compatibility with the essential components of the sheet.

As used herein, the term "wood flour" refers to the product obtained by attrition mill or hammer mill grinding of selected log wood. The form of the particle and its size distribution are important in order to obtain the desired effect from the wood flour. It is important to obtain the original fibrous structure of the wood and the aforementioned grinding process provides particles of uniform size consisting of truncated fiber bundles. To obtain the strongest wood flour it is necessary to grind the wood without much interference with the complex cell structure and obtain as long a filament structure as possible. The fiber bundles can be classified by mesh size and commercial grades generally range from 40 to 325 mesh particles, i.e. about 5 to 425 microns. The preferred wood flour is 200 mesh grade flour, a product rich in particles in the 3 to 130 micron size range, i.e. 75 percent by weight of the particles are in this size range. The aspect ratio (L/D ratio) is about 2.5:1 for these truncated bundles, and the apparent or bulk density of the 200 mesh flour is generally about 0.32 g/cm³.

The wood flour can be prepared from soft or hardwood and is preferably prepared from the heartwood of selected logs. It is preferred to use the hardwood flours, such as maple wood flour, when preparing outsole material according to the present invention, since the hardwood flours provide synthetic leather sheets which are more easily processed by conventional processing methods such as edge trimming. Minor amounts, for example up to about 1 percent by weight of the total solids in the sheet, of fibrids may also be added without adversely influencing the leather-like properties of the sheet.

The leather-like sheets of the present invention are prepared by providing a liquid dispersion, preferably an aqueous slurry of the solid components, forming the dispersion onto a support in the form of a pond, and removing the liquid content to form a dry coherent sheet. Further heating and/or pressing can take place to densify the sheet or further cure or crosslink the elastomer as desired. The liquid removal can be accomplished by any of the known techniques as long as the removal takes place under conditions which result in the formation of a homogeneous sheet which is not stratified or otherwise nonuniform in composition or appearance.

A particularly useful method of forming the leather-like sheets of this invention comprises providing an aqueous slurry of an elastomeric dispersion, preferably a polyurethane latex, particulate fillers, and a wood and/or leather fibrous reinforcing component, other additives being optional and depositing the slurry on a foraminous supporting surface, for example, a handsheet mold or the moving screen of a papermaking machine, to form a waterlaid sheet. The technique of forming waterlaid sheets is well known in the art and has been employed in the papermaking art as well as the manufacture of synthetic leather; see the aforementioned U.S. Pat. Nos. 3,436,303 and 3,756,909. The deposited slurry is drained by gravity on the supporting surface and further water is removed by the application of vacuum and/or mechanical compression. The remaining water is removed by drying such as by drying in an air circulating oven, or by contacting the sheet with a heated roll or platen such as by passing the sheet over "hot cans."

Ideally, a dilute, e.g. 0.5 to 7% by weight solids, slurry should be brought to the screen of a papermaking machine as uniformly dispersed as possible with the fibers randomly oriented. The slurry (often referred to as the furnish in the papermaking art) should have a uniform concentration or "consistency" and a uniform volume of slurry should be delivered at a uniform velocity to every section across the width of the moving screen. The papermaking machines useful in the practice of the present invention can be of the Fourdrinier, cylinder or modified cylinder type, or the like. The foraminous supporting surface can be any screen or other support of a porosity sufficient to retain the slurried solids while allowing drainage of the liquid.

In preparing waterlaid sheets to be used as outsole material the amount of elastomeric solids should be at least 40 percent by weight of the essential solids and can be as high as 80 percent by weight of the essential solids. Insole material can be made using as little as 15 percent by weight elastomeric solids. Hot pressing of the dried, waterlaid sheet reduces its porosity and densifies it, thus providing the characteristics of the tough, substantially impermeable material from which outsoles are made.

The elastomeric solids can be nonionic, anionic or cationic in character. Depending upon the ionic character of the elastomeric binder, it may be necessary to treat the nonelastomeric essential solids with suitable cationic or anionic agents to promote flocculation of the elastomeric latex solids onto the solids as will be discussed in greater detail hereinafter.

Typically, when a papermaking machine is employed, an aqueous slurry ("stock" or furnish) is kept in suspension and at a desired consistency or solids content (e.g. 0.5 to 7 percent by weight) in a suitable container (e.g. a head box or vat) such that the solids suspended in the slurry can be deposited on the foraminous surface. Removal of the water by vacuum and/or gravity provides a wet, waterlaid sheet which can be dried and further processed. In order to prepare a waterlaid sheet, the dispersed elastomer particles in the slurry must be agglomerated or, alternatively, exhausted onto the remaining solids, to form globular elastomeric particles which can be retained on the porous support of the papermaking machine and will bind the remaining solids into a coherent sheet. This process of agglomerating or exhausting the elastomeric particles is generically referred to broadly as flocculation (resulting in flock particles) and will be described in greater detail hereinafter. The flocculation of the elastomeric solids can take place prior to adding the aqueous slurry to the papermaking machine or can take place in the head box or vat of the machine or in a holding chest prior to entering the head box.

The method of flocculating the elastomeric solids may vary depending upon the ionic character of the elastomer and the remaining essential solids. When the latex employed as the elastomeric binder is anionic in character flocculation of the latex onto the non-elastomeric essential solids (i.e., exhaustion) may be promoted by the prior treatment of the nonelastomeric essential solids with a cationic deposition agent such as a water-compatible cationic or cationizable resin.

By "water-compatible" resin is meant a resin which will form a true solution or a stable dispersion in water. Cationic, water-compatible resins have been used in the preparation of waterlaid sheets for many years, and typical dimethylolurea water-soluble polyfunctional nitrogen base resins selected for this purpose are described in U.S. Pat. No. 2,769,712. U.S. Pat. No. 2,601,671 discloses cationic melamine-aldehyde condensation products also useful as cationic resins which impart a positive electrical charge to leather when absorbed on the surface of leather fibers. A preferred class of resins are the commercially available polyamide-epichlorohydrin wet strength resins of the type described in the *Technical Journal of the American Pulp and Paper Industry* (TAPPI), Vol. 52, pages 1157–1161 and 1162–1168 (1969), such as available commercially under the tradename "Kymene" 557, Hercules Powder Co. Other commecially available cationic resins noted in the TAPPI articles are the melamine-formaldehyde and polyethyleneimine cationic polymers.

The pretreatment of the nonelastomeric solids with the deposition agent is generally carried out by forming an aqueous slurry of the nonelastomeric solids, adding the deposition agent, and allowing the deposition agent to interact with the nonelastomeric solids rendering them positively charged. Blending the dispersion of anionic latex and cationically charged nonelastomeric solids with rapid mixing causes the ionic elastomer particles to exhaust onto the oppositely charged nonelastomeric particles forming globular particles which can readily be formed as a waterlaid sheet. The exhaustion may also be assisted by heating the slurry, such as by injection of live steam at a slow rate.

When a cationically charged elastomeric latex is employed in the present invention, ordinarily no deposition agent is used since the particulate fillers and fiber reinforcing material, such as wood fibers, are generally anionically charged and exhaustion occurs without the use of a deposition agent. Of course, if leather fibers are employed as the reinforcing fiber in the nonelastomeric solids in combination with a cationic latex, pretreatment of the leather fibers with an anionic deposition agent may be required where the leather fibers are naturally cationic (e.g. chrome tanned leather fibers). Where blends of anionic fillers and fibers with cationic fillers and fibers are used, it may be advantageous to separately blend the anionic fillers and fibers with a cationic latex and the cationic fillers and fibers with an anionic latex, exhaust each separately and then combine the exhausted slurries. Exhaustion of the cationic latex onto the shell flour and wood fibers is normally very rapid and may produce flock particles which are too large. In this case a cationic surfactant can be added to the blend to slow the rate of elastomer exhaustion and thus produce the desired flock size. However, the cationic surfactant must be present in the slurry before the latex is added.

When nonionic elastomeric dispersions are used, the elastomer does not readily exhaust onto the nonelastomeric solids since there is no strong ionic attraction between the elastomeric and nonelastomeric solids. In these circumstances, flocculation of the elastomer can be induced by conventional methods known in the art such as by the addition of aluminum sulfate, heating or freezing, or mechanical means, e.g. by subjecting to high shear mixer. The elastomer particles can thus be caused to flocculate by forming agglomerates of elastomer which may or may not be deposited on the nonelastomeric solids. These agglomerated particles are of sufficient size to permit the formation of a coherent waterlaid sheet.

When possible it is advantageous to flocculate the elastomer by techniques which cause exhaustion of the elastomer onto the nonelastomeric solids since the resulting sheets generally exhibit improved internal bond strength compared to those sheets prepared without exhaustion.

Regardless of the mechanism by which flocculation occurs, it is desirable to control the size of the resulting flock particles within broad limits. Thus, the particles must be large enough to precipitate and form a homogeneous waterlaid sheet without stratifying in the sheet. However, the flock particles must not be so large as to result in a heterogeneous sheet having a mottled appearance or areas rich in or starved of elastomer as this results in a sheet having poor esthetic qualities and reduced physical properties.

After deposition of the solids on the screen and draining of the water, the sheet, after wet pressing, can be dried in a hot-air oven or with a heated element such as a hot platen or roll. Drying of the sheet produces a tough, coherent, leather-like sheet material which can be further toughened with heating at temperatures above 100° C. The specific gravity of the resulting sheets is nominally about 1, but will vary depending upon the particular components employed and the ratios of the components. As pointed out previously herein (and in U.S. Pat. No. 3,436,303), mild pressure, even at moderately elevated temperatures, causes the elastomer in the sheet to flow — a process which densifies the material to provide a satisfactory outsole material. This flowing of elastomer obliterates the individuality of flocculated elastomer particles or particle clusters and renders the sheets substantially impermeable.

Materials intended for outsoles are generally formulated and processed to be substantially impermeable in order to better resist the effects of the environment. Densification of waterlaid sheets obtained by the above process can be accomplished by heating these sheets under a pressure of about 20 – 100 psi (1.4 – 7 kg/cm$^2$) or less for a period of 4 to 5 minutes at about 160° C. When dense particulate fillers such as the hard vegetable shell flours are employed in preparing the sheets, pressures of about 20 psi (1.4 kg/cm$^2$) or less can be used to obtain the desired degree of densification. When particulate fillers having a lower density, e.g., hollow microspheres, are used pressures up to about 100 psi (7 kg/cm$^2$) may be necessary to obtain the desired density.

Sheets can be waterlaid to any desired thickness, ranging from about 10 mils to 400 or 500 mils, which would be even thicker than a 12-iron shoe sale. When it is not convenient to form 6-iron, 9-iron, or 12-iron sheets to size on the paper-making machine (a 6-iron sheet is 0.32 cm thick, and a 9-iron sheet is 0.48 cm thick), relatively thin sheets can be formed and laminated with heat and pressure and/or adhesives, as described in U.S. Pat. No. 3,436,303. The dried, heat-treated and/or pressed product can be finished by conventional techniques to provide the finished appearance of high quality leather outsole material.

Waterlaid leather-like sheets can be prepared which have physical properties particularly suited for the manufacture of shoes and particularly as the outsole of shoes. Sheets to be used for outsoles can be formulated to have an internal bond strength or dry peelback value, determined at a 180° peel rate of 12 inches per minute, of at least 12 pounds per lineal inch, a Ross flex life of at least 30,000 and preferably at least 50,000 cycles and an Instron stiffness of 200 or less.

The dry peelback resistance, or internal bond strength, is the force in pounds required to propagate a split in the thickness of a 1 by 6 inch sample at a separation rate of 12 inches per minute. The higher the number, the stronger the internal bond. The dry peelback resistance should be at least 10 pounds per lineal inch for even a marginally useful outsole material. A good outsole material should have a dry peelback resistance of at least 12 pounds per lineal inch, preferably 15 pounds per lineal inch.

The "Ross Flex Life" of the sheets of this invention is determined by cutting a 0.1 inch (0.25 cm) -wide slit in a 1 inch (2.54 cm) sample sheet and flexing it on a "Ross Rubber Flexing Machine" (Emerson Apparatus Co., Melrose, Mass.). Samples are conditioned at 80% relative humidity and 20° to 25° C. before the Ross flex test. The rating is determined by reference to the number of flexing cycles which will cause the initial 0.1 inch (0.25 cm) -wide slit to propagate and rupture the sample. Alternatively, the sample is flexed 50,000 times and the "rating number" measured as the width of the slit or tear after flexing divided by the width of the original hole before flexing. Thus, if after 50,000 cycles an original 0.1 inch (0.25 cm) hole had grown to 0.5 inches (1.25 cm) the rating would be 5.

Stiffness values are obtained by measuring the performance of a 1 × 6 inch (2.54 cm × 15.24 cm) sample of the material utilizing a four point Instron stiffness test. That is, the sample being supported at two points 5 inches (12.7 cm) apart and a downward force measured in grams applied at two points, 1¼ inches (3.2 cm) apart, midway between the two support points to provide a deflection of ½ inch (1.25 cm). Stiffness values (i.e. stiffness value = grams Force/(caliper, in mils)$^3$ × 10$^{-6}$). For a polymeric sheet having a caliper of 200 mils (0.5 cm) or less should be a maximum of 200 as measured on an Instron tester. Preferred formulas made according to the present invention can be made to have a stiffness value of 80 or less.

For insole and outsole materials an important characteristic is the wet spread of the sheets measured as the percent area increase when a 4 × 6 inch (10 cm × 15 cm) sample is immersed in water at 24° C. for 30 minute, 2 hour, and 24 hour periods. A small number indicates a more stable product. Maximum wet spread desirable for commercial insole material is 5 percent after 30 minutes and for outsole 1.5 percent after 30 minutes.

The following examples further illustrate the practice of the present invention wherein proportions are expressed in parts or percent by weight unless otherwise indicated.

EXAMPLE 1

An anionic, self-emulsified, elastomeric polyurethane latex suitable for use as a binder for synthetic leather sheets was prepared as follows:

767 grams of an 80/20 molar blend of 2,4/2,6 tolylene diisocyanate (Nacconate 80, Allied Chemical Co.) and 2233 grams polyoxypropylene glycol, OH No. 110.3 were charged to a 5-liter reaction flask and heated with agitation at 88° C. for 4 hours. A sample was taken and analyzed, and yielded an NCO equivalent weight of 685 and a room temperature Brookfield viscosity of 12,500 cps. This prepolymer was cooled to 77° C. and 31.2 grams of 96% $H_2SO_4$ (A.R. Grade) were added dropwise with strong agitation. Severe gas evolution ($CO_2$) was observed during and immediately after the $H_2SO_4$ addition and the prepolymer slowly changed from clear straw color to clear reddish brown. The prepolymer was held at 77° C. for 1 hour after the $H_2SO_4$ addition was completed; then cooled to 66° C. for emulsification.

4500 grams of deionized water were placed into a 5-gallon (18.9 liters) container and 16.2 grams anhydrous soda ash were dissolved into it, with agitation. The prepolymer was then emulsified into this by pouring it slowly into the container while the contents were being agitated by ½ h.p. "Eppenbach Homomixer" (Gifford-Wood, Inc.) running at maximum speed. A substantial amount of foam was generated during agitation, and it continued to build for about 30 minutes thereafter due to $CO_2$ evolution caused by the isocyanate-water reaction, after which the foam collapsed. The emulsion was allowed to stand overnight before filtering.

Percent solids was measured on the filtered latex and found to be 39.4%. pH was 6.2. 25 grams were poured into a 7 inch (18 cm) diameter Petri dish and dried overnight at 66° C. Tensile properties were measured on the resulting film and found to be 1800 psi (126 kg/cm$^2$) ultimate tensile, 900% elongation at break, and 280 psi (20 kg/cm$^2$) 100% modulus.

A waterlaid, leather-like sheet suitable for outsole material was prepared using the anionic polyurethane latex as the elastomeric binder, pecan shell and cherry pit flour as the particulate filler, and wood fiber as the reinforcing fiber. The ingredients were blended in the following proportions:

| Ingredient | Parts | Weight Percent of Essential Solids |
|---|---|---|
| Anionic Polyurethane Solids (26.1 kg 19.7% Solids Dispersion) | 125 | 55.5 |
| Vegetable Shell Flour | | |
| Pecan Shell | 48 | 21.5 |
| Cherry Pit | 32 | 14.1 |
| Woodfiber/14° SR ("Mersanier J", Rayonier ITT, Inc.) | 20 | 8.9 |
| | | 100 % |
| Cationic Deposition Agent ("Kymene" 557, Hercules Powder Co.) | 3 | (3% by wt. of fiber and filler) |
| Defoamer ("Nalco" 212, Nalco Chemical Co.) | 1 | (1% by wt. of fiber and filler) |
| Fungicide ("Dowicide" G, Dow Chemical Co.) | 0.6 | (0.5% by wt. of polymer solids) |
| Sulfuric Acid (10%) | Sufficient to adjust pH to 4.3 | |

3.295 kilograms of shell flour was dispersed in 54 gallons (204 liters) of water with rapid agitation for 10 minutes. 0.826 kilograms of wood fiber in 7.5 gallons (28.4 liters) of water was then added and the total volume of the mixture increased to approximately 71 gallons (269 liters) by the addition of water. This provided a slurry having a consistency of 1.5 percent (solids content by weight). The temperature of the slurry was adjusted to 24° C. with steam and the cationic deposition agent ("Kymene" 557, Hercules Powder Co.), was added as a 10 percent solution. The deposition agent was allowed to interact with the shell flour and the wood fiber for a period of 15 minutes, after which the pH of the slurry was adjusted to 4.5 by the addition of 10 percent sulfuric acid. After mixing the slurry for about 5 minutes, a defoamer ("Nalco" 212, Nalco Chemical Company) and a fungicide ("Dowicide" G, Dow Chemical Company) were added as 10% solutions in water and the slurry mixed 1 minute after each addition.

Separately, the anionic urethane latex was diluted with equal parts of deionized water to approximately 20% solids and added to the above slurry with rapid agitation. Rapid mixing (without air entrainment) while adding the polyurethane latex is necessary to avoid the formation of an excessively large polymer flock on the fiber and the shell flour. The slurry temperature was raised to 41° C. (by injection of steam) to complete the flocculation. At this point the slurry was at a temperature of 41° C., with a pH of 4.3 and a consistency (solids) of about 2.7 percent.

Hand sheets approximately 20 inches square (51 cm × 51 cm) were prepared by charging 89 pounds (40.4 kg) of wet slurry having a consistency of 2.68 percent to a sheet mold containing 3 inches of water and approximately 800 cc of a cationic flocculant (0.05 percent "Separan"Cp-7, Dow Chemical Company). The flocculant assists in maintaining floc stability, helps to precipitate any polymer that was not precipitated in the slurry tank and can be used to adjust the drainage rate. During the additions, the slurry was kept in motion by use of a perforated plunger. When the water level reached approximately 3–4 inches (8 cm – 10 cm) deep the plunger was removed and the sheet allowed to form by removal of the remainder of the water. When all the visible water had been removed the sheet was further dried by applying a rubber apron on top of the wet mat while a vacuum was applied to the mat beneath the supporting screen for approximately 45 seconds. The wet mat was then removed from the sheet mold screen and pressed for 30 seconds between blotter paper on a platen press at a pressure of about 4 psi (0.3 kg/cm$^2$). The semi-dry mat was then dried in an oven for 6 hours at 66° C. to a final moisture content of about 1% by weight or less.

The dried sheet was then cured in a platen press at 160° C. for 4½ minutes at a pressure of about 20 psi (1.4 kg/cm$^2$). This provided a 9-iron (189 mils, 0.48 cm) outsole material having a specific gravity of about 1.0. The outsole material was conditioned for 16 hours at 27° C. and 70% relative humidity and tested with the results shown in the TABLE below.

EXAMPLE 2

A cationic, self-emulsified, elastomeric polyurethane latex suitable for use as a binder for synthetic leather sheets was prepared as follows:

697 grams of 80/20 molar blend of 2,4/2,6 tolylene diisocyanate (Nacconate 80, Allied Chemical Co.) were charged to a five liter flask along with 2008 grams of polyoxy propylene diol (Niax PPG-1025, Union Carbide Chemical Co.), OH No. 111.9. The flask was heated with agitation at 88° C. for 4 hours, whereupon a small sample was removed for isocyanate equivalent weight determination. The test results yielded a value of 683 eq. wt. indicating essentially complete NCO/OH reaction. The prepolymer was cooled to 49° C. and 47.4 grams of methyl diethanolamine were added slowly with strong agitation. The reaction mixture was stirred at 49° C. for 1 hour. Then it was emulsified by pouring it slowly into a 5-gallon (18.9 liters) container containing 80 grams of acetic acid diluted to 4000 grams total weight with deionized water and agitated by a ½ h.p. Eppenbach Homomixer running at maximum speed. A substantial amount of foam build-up was observed as the prepolymer "cured" via isocyanate-water reaction with $CO_2$ liberation. After about 1 hour the foam decayed and the resultant latex was allowed to stand overnight before filtering.

Percent solids was measured on the filtered latex and found to be 41.2%. pH was 3.6. Twenty grams were dried at 66° C overnight in a six inch (15 cm) diameter Petri dish to form a film suitable for tensile testing. Tensile properties were measured and found to be 740 psi (52 kg/cm²) ultimate tensile, 1050% elongation at break, and 150 psi (10.5 kg/cm²) 100% modulus.

A synthetic leather outsole material was prepared in a manner similar to that of Example 1, but using the above cationic urethane latex instead of the anionic latex used in Example 1. The use of the cationic latex dictates a slightly different order of addition of the defoamer and the fungicide and eliminates the need for a deposition aid in the present formulation. The following ingredients were mixed in the proportions shown:

| Ingredients | Parts | Weight Percent of Essential Solids |
|---|---|---|
| Cationic Polyurethane Solids (24.95 kg 20.6% solids dispersion) | 125 | 55.5 |
| Vegetable Shell Flour | | |
| Pecan Shell | 48 | 21.4 |
| Cherry Pit | 32 | 14.2 |
| Woodfiber ("Mersanier J", Rayonier ITT, Inc.) | 20 | 8.9 |
| | | 100% |
| Defoamer ("Nalco" 212, Nalco Chemical Co.) | 1 | (1% by wt. of fiber and filler) |
| Fungicide ("Dowicide" G, Dow Chemical Co.) | 0.6 | (0.5% by wt. of polymer solids) |
| Sulfuric Acid (10%) | Sufficient to adjust pH to 4.5 | |

The shell flour and wood fiber slurry was prepared in the same manner as in Example 1, but no deposition agent was used. After adjusting the slurry pH to 4.5 with sulfuric acid and mixing for 5 minutes, the cationic polyurethane latex (diluted with equal parts of deionized water to about 20% solids) was charged to the slurry. Precipitation was very rapid due to the fact that the wood fibers and shell flour are anionically charged and the polymer is cationic. When the precipitation was complete the defoamer was added followed by the addition of the fungicide at one minute intervals. The defoamer and fungicide used in this example were anionically charged and, if added to the pulp slurry before the cationic polyurethane latex, would tend to cause a "seedy" or rough precipitate in the water phase.

A hand sheet was made in the same manner as described in Example 1 except that the oven-dried sheets containing 1% or less moisture were pressed at approximately 20 psi (1.4 kg/cm²) for 4½ minutes at 138°–154° C. to increase the density to a level approximating that obtained in Example 1 (i.e. a specific gravity of 1).

The leather-like outsole material obtained was found to have properties similar to that of high-quality natural leather. The product was conditioned as in Example 1, tested, and found to have the properties shown in the Table below.

EXAMPLE 3

An outsole material similar to that prepared in Example 1 was prepared using chrome tanned leather fibers as the reinforcing fibers instead of the wood fibers used in Example 1. The materials were blended in the proportions shown below:

| Ingredient | Parts | Weight Percent of Essential Solids |
|---|---|---|
| Anionic Polyurethane Solids (Example 1) | 100 | 50.0 |
| Shell Flour | | |
| Pecan Shell | 27 | 13.5 |
| Cherry Pit | 18 | 9.0 |
| Chrome leather fibers | 55 | 27.5 |
| | | 100% |
| Cationic Deposition Agent ("Kymene" 557) | .45 | (1% by wt. of shell flour) |
| Defoamer ("Nalco" 212) | 2 | (2% by wt. of fiber and filler) |
| Fungicide ("Dowicide" G) | 0.5 | (0.5% by wt. of polymer solids) |
| Sulfuric Acid (10%) | Sufficient to | |

| Ingredient | Parts | Weight Percent of Essential Solids |
|---|---|---|
| | adjust pH to 4.5 | |

1.125 kilograms of the shell flour was dispersed in 24 gallons (90.8 liters) of water with rapid agitation for 10 minutes. About 10 percent of the total defoamer was added to the slurry to eliminate foam buildup. The slurry temperature was adjusted to 24° C. and a cationic resin, deposition agent ("Kymene" 557) was added as a 10 percent solution and the mixing continued for 15 minutes. The leather slurry (prepared separately in a pulper at approximately 3.0 percent consistency to 15°–20° SR drainage rate, as determined by Schopper-Reigler freeness test) was added to the shell flour dispersion and the consistency of the combined slurry adjusted by the addition of water to approximately 1.5 percent. The remainder of the defoamer and the fungicide were added to the slurry at one-minute intervals. The pH of the slurry was adjusted to 4.5 by the addition of 10% sulfuric acid. The anionic polyurethane latex was diluted with equal parts deionized water to about 20% solids and added to the slurry with agitation while avoiding air entrainment. The mixing was continued for about 15 minutes until the polymer precipitation was complete. At this point the precipitated slurry had a pH of about 4.7 and a consistency of about 2.4 percent.

A hand sheet was prepared as in Example 1 using 91 pounds (41.3 kg) of the wet slurry and the resulting wet sheets were dried in a circulating oven for 6 hours at 66° C. The sheets were then redried for approximately 20 minutes at 104° C. to a moisture content of 1% by weight maximum and densified and cured by heating the sheets in a platten press for about 4.5 minutes at 160° C. at a pressure of about 20 psi (1.4 kg/cm²). The resulting product had a leather-like feel and appearance and was suitable for use as outsole material. The sheets were tested (conditioning the sheets for 16 hours at 27° C. and 70 percent relative humidity as in Example 1) and found to have the properties shown in the Table below.

EXAMPLE 4

A waterlaid leather-like insole material was prepared using the anionic polyurethane latex prepared in Example 1 as the elastomeric binder and shell flour (pecan shell flour and cherry pit flour) and wood fiber as the essential nonelastomeric solids. The ingredients were blended in the following proportions:

| Ingredient | Parts | Weight Percent of Essential Solids |
|---|---|---|
| Anionic Polyurethane Solids (Example 1) | 50 | 33.3 |
| Vegetable Shell Flour | | |
| Pecan Shell | 42 | 28 |
| Cherry Pit | 28 | 18.7 |
| Wood Fiber ("Dryden" unbleached Kraft, Montmorency Paper Co.) | 30 | 20 |
| | | 100% |
| Cationic Deposition Agent ("Kymene" 557) | 0.75 | (0.75% by wt. of fiber and filler) |
| Defoamer ("Nalco" 212) | 2 | (2% by wt. of fiber + filler) |
| Fungicide ("Dowicide" G) | 0.25 | (0.5% by wt. of polymer solids) |
| Sulfuric Acid (10%) | Sufficient to adjust pH to 4.5 | |

935 grams of pecan shell flour and 625 grams of cherry pit flour were dispersed in 21 gallons (79.5 liters) of water using agitation. 10 percent of the defoamer was used to prevent excessive foam buildup. The woodfiber ("Dryden" unbleached Kraft, pulped 25 minutes in a pulper to a freeness of approximately 14° SR) was added and the consistency of the slurry adjusted by the addition of water to approximately 1.5 percent. The temperature of the slurry was adjusted to 24° C. and a cationic resin deposition agent ("Kymene"557) was added and the mixture agitated for about 15 minutes. The fungicide and the balance of the defoamer was added at 1 minute intervals. The pH of the slurry was adjusted to 4.5 by the addition of 10 percent sulfuric acid and mixing continued for about 5 minutes. The 40% solids anionic polyurethane latex was diluted with equal parts of deionized water and was added to the slurry. After 15 minutes of mixing the precipitation was complete. The precipitated slurry had a pH of 4.7 and a consistency of 1.9 percent.

A hand sheet was prepared as in Example 1 using approximately 50 pounds (22.7 kg) of the slurry prepared above. The slurry was charged to the sheet mold which contained about 2 inches (5.1 cm) of water and about 200 cc of 0.05% cationic flocculant (Separan CP-7). The slurry was kept in motion until drainage had lowered the water level to about 3 – 4 inches (8 – 10 cm) deep after which agitation was discontinued and the sheet allowed to form by removal of the remainder of the water. Following the removal of water by vacuum application for about 30 seconds, the wet mat was removed from the sheet mold screen and pressed for about 15 seconds between blotter paper on a platen press at 7 psi (0.5 kg/cm²). The semi-dry mats were further dried at 52° C. for 4 hours. The resulting sheets were then cured and densified by heating in a platen press for about 2 minutes at 160° C. under a pressure of 5 – 10 psi (0.35 – 0.7 kg/cm²). The resulting sheet had the appearance and feel of a good quality leather insole. The sheets were conditioned as in Example 1, tested, and found to have the properties tabulated in Table I below.

TABLE I

Physical Properties of Waterlaid Sheets

| | Example No. 1 | 2 | 3 | 4 (insole) |
|---|---|---|---|---|
| Caliper, mils | 190 | 180 | 198 | 103 |
| (cm) | (0.48) | (0.46) | (0.5) | (0.26) |
| Apparent Density, g/cm$^3$ | 0.992 | 1.018 | 1.021 | 0.716 |
| % Water Pickup | | | | |
| 30 minutes | 8.8 | 9.1 | 1.8 | 67.6 |
| 2 hours | 12.6 | 13.2 | 3.0 | 68.3 |
| 24 hours | 21.9 | 21.4 | 13.2 | 74.5 |
| % Wet Spread | | | | |
| 30 minutes | 0.9 | 0.7 | 0.5 | 3.0 |
| 2 hours | 2.1 | 1.6 | 0.5 | 3.2 |
| 24 hours | 5.0 | 3.6 | 5.9 | 3.4 |
| Internal Bond | | | | |
| Pounds per lineal inch | 17.2 | 18.2 | 16.4 | 3.8 |
| Kg per lineal cm | 3.1 | 3.2 | 2.9 | 0.7 |
| Flex Value (50,000 cycles) | 5.3 | 10 at 22,000 | 2.0 | 7 at 46,000 |
| Stiffness Value | 80 | 101 | 80 | 130 |
| Edge Trim | *Very Good | *Very Good | *Very Good | — |
| Conformability | — | — | — | Very Good |

*Sheet edge trimmed easily. No burning of the sheet by trimming knives and no buildup of polymer at edge of sheet. Edge is smooth with good appearance.

EXAMPLE 5

A leather-like sheet suitable for outsole use was prepared as in Example 1 using a particulate filler of walnut shell flour and an additional wood flour additive, as follows:

| Ingredient | Parts | Weight Percent of Essential Solids |
|---|---|---|
| Anionic Polyurethane Solids (As in Example 1) | 125 | 61 |
| Walnut Shell Flour | 60 | 29 |
| Wood Fiber ("Dryden" unbleached Kraft 16° SR) | 20 | 10 |
| | | 100 % |
| Wood Flour | 20 | |
| Cationic Deposition Agent ("Kymene" 557) | 1.5 | (1.5% by wt. of fiber + filler + wood flour) |
| Defoamer ("Nalco" 212) | 2 | (2% by wt. of fiber + filler + wood flour) |
| Fungicide ("Dowicide" G) | 0.5 | (0.5% by wt. of polymer solids) |
| Sulfuric Acid (10%) | to pH 4.5 | |

A waterlaid sheet was prepared as in Example 1. The sheets were redried for 20 minutes at 104° C. before pressing at 160° C. for 4.5 minutes under a pressure of 22 psi (1.5 kg/cm$^2$). The product was useful as a leather-like outsole material with a greater degree of stiffness than in Example 1.

EXAMPLE 6

A leather-like outsole material was prepared as in Example 1 using almond shell flour as the particulate filler as follows:

| Ingredient | Parts | Weight Percent of Essential Solids |
|---|---|---|
| Cationic Polyurethane Solids (Example 2) | 100 | 50 |
| Almond Shell Flour | 80 | 40 |
| Wood Fiber ("Dryden" Unbleached Kraft 16° SR) | 20 | 10 |
| | | 100 % |
| Defoamer ("Nalco" 212) | 2 | (2% by wt. of fiber + filler) |
| Fungicide ("Dowicide" G) | 0.5 | (0.5% by wt. of polymer solids) |
| Sulfuric Acid (10%) | to adjust pH to 4.5 | |

Waterlaid sheets were prepared as in Example 1 except that the sheets were pressed at 160° C. for 5 minutes under a pressure of 73 psi (5 kg/cm$^2$). A leather-like outsole material having acceptable physical properties resulted from this procedure.

EXAMPLE 7

A leather-like outsole material employing microspheres as the particulate filler was prepared by blending the following ingredients:

| Ingredient | Parts | Weight Percent of Essential Solids |
|---|---|---|
| Anionic Polyurethane Solids (Example 1) | 122 | 54.3 |
| Microsphere Filler (D-7 "Microvoids", N.L. Industries) | 83 | 37 |
| Wood fiber, 14° SR ("Mersanier" J pulp) | 20 | 8.7 |
| | | 100% |
| Cationic Deposition Agent ("Kymene" 557) | 3 | (3% by wt. of fiber + filler) |
| Defoamer ("Nalco" 212) | 2 | (2% by wt. of fiber + filler) |
| Fungicide ("Dowicide" G) | 0.6 | (0.5% by wt. of polymer solids) |
| Sulfuric Acid (10%) | to adjust pH to 4.5 | |

Waterlaid sheets were made using the following procedures:

*Precipitation Procedure:* Slurry pulp in Waring blender 1 minute at 1.5% solids in water. Dilute to 8000 cc total volume with water and add "Microvoids." Add deposition agent and mix 15 minutes. Adjust slurry pH to 4.5 with 10% $H_2SO_4$. Add fungicide and defoamer. Add polymer dispersion after reducing solids to approximately 20% with water. Mix 15 minutes to complete polymer flocculation. Heat to 40° C. to coalesce polymer particles.

Waterlaid sheets were made as in Example 1. The sheets were then redried at 104° C. for 15 minutes. The sheets were then pressed at 160° C. for 3 minutes under a pressure of 50 psi (3.5 kg/cm$^2$). Leather-like outsole material resulted which had a good balance of physical properties similar to those obtained with vegetable shell flour particulate fillers.

EXAMPLE 8

A leather-like outsole material was prepared using microspheres in combination with the cationic polyurethane latex of Example 2.

| Ingredient | Parts | Weight Percent of Essential Solids |
|---|---|---|
| Cationic Polyurethane Solids (Example 2) | 125 | 55.5 |
| Microsphere Filler (D-1 "Microvoids", N. L. Industries) | 75 | 33.4 |
| Wood Fiber, 14° SR ("Mersanier" J Pulp) | 25 | 11.1 |
| | | 100% |
| Defoamer ("Nalco" 212) | 2 | (2% by wt. of filler + fiber) |
| Fungicide ("Dowicide" G) | 0.6 | (0.5% by wt. of polymer solids) |
| Sulfuric Acid (10%) | to adjust pH to 4.5 | |

Sheets were made using the following procedure:
*Precipitation Procedure:* Slurry aqueous pulp at 1.3% solids in Waring blender for 1 minute and dilute slurry to approximately 0.5% solids with water, add Microvoids while mixing. Add some defoamer if necessary and lower slurry pH to 4.5 with $H_2SO_4$. Add cationic polyurethane to rapidly mixing slurry. After 5 minutes mixing, add fungicide and balance of defoamer.

Waterlaid sheets were prepared as in Example 1. The dry sheets were pressed at 82° C. for 3 minutes under a pressure of 74 psi (5.2 kg/cm$^2$). The sheets obtained exhibited a good balance of leather-like properties and were suitable for outsole material.

EXAMPLE 9

Leather-like sheets using cherry pit flour as the particulate filler were prepared by combining the following ingredients:

| Ingredient | Parts | Weight Percent of Essential Solids |
|---|---|---|
| Cationic Polyurethane Solids (Example 2) | 125 | 55.6 |
| Cherry Pit Flour | 85 | 37.8 |
| Wood Fiber, 18° SR, ("Dryden" unbleached Kraft) | 15 | 6.6 |
| | | 100% |
| Defoamer ("Nalco" 212) | 2 | (2% by wt. of filler + fiber) |
| Fungicide ("Dowicide" G) | 0.6 | (.05% by wt. of polymer solids) |
| Sulfuric Acid (10%) | to adjust pH to 4.5 | |

Waterlaid sheets were prepared using the procedures of Example 2 except that the sheets were made with about ¼ the amount of solids in the aqueous slurry used in Example 2. Accordingly, 4 sheets were laminated at 138° C. for 4.5 minutes at a pressure of 14 psi (1 kg/cm²). The laminate obtained was useful as a leather-like outsole material.

EXAMPLE 10

A leather-like outsole material was prepared using an acrylonitrile-butadiene copolymer as the elastomeric binder. The following ingredients were combined:

| Ingredient | Parts | Weight Percent of Essential Solids |
|---|---|---|
| Acrylonitrile-Butadiene Copolymer ("Hycar" 1562, B.F. Goodrich) | 125 | 55.6 |
| Pecan Shell Flour | 80 | 35.5 |
| Wood Fiber, 14° SR ("Mersanier" J pulp) | 20 | 8.9 |
| | | 100% |
| Defoamer ("Nalco" 212) | 2 | (2% by wt. of filler + fiber) |
| Alum | (sufficient to lower pH to 4.5 and flocculate polymer) | |

A slurry for use in preparing a waterlaid sheet was prepared employing the following:
*Precipitation Procedure:* Slurry woodfiber in water at 2% solids. Slurry shell flour in water at 4% solids and add to woodfiber. Dilute combined slurry with water to 1.5% solids. Add defoamer and after 1 minute add aqueous acrylonitrile-butadiene latex diluted to 20% solids. After mixing combined slurry, flocculate polymer by the addition of aluminum sulfate sufficient to adjust pH to 4.5.

Waterlaid sheets were prepared from the slurry as in Example 1 and pressed at 160° C. for 3 minutes at 52 psi (3.5 kg/cm²). The sheets obtained with this procedure exhibited leather-like outsole properties and very good internal bond strength.

EXAMPLE 11

A leather-like outsole was prepared using a Neoprene latex as the elastomeric binder in the following formulation:

| Ingredient | Parts | Weight Percent of Essential Solids |
|---|---|---|
| "Neoprene" 450 solids (DuPont) (anionic) | 125 | 55.6 |
| Pecan Shell Flour | 80 | 35.5 |
| Woodfiber, 14° SR, ("Mersanier" J Pulp) | 20 | 8.9 |
| | | 100% |
| Cationic Deposition Agent ("Kymene" 557) | 3 | (3% by wt. of fiber + filler) |
| Defoamer ("Nalco" 212) | 2 | (2% by wt. of fiber + filler) |
| Antioxidant ("Neozone" D, Dupont) | 2 pts/100 pts "Neoprene" | |
| Zinc Oxide | 5 pts/100 pts "Neoprene" | |
| Pre-floc Control ("Tamol" N, Rohm & Haas Co.) | 1 pt/100 pts "Neoprene" | |
| Alum | (sufficient to lower pH to 4.5 and flocculate polymer) | |

A slurry for use in preparing a waterlaid sheet was prepared employing the following:

*Precipitation Procedure:* Slurry woodfiber and water at 2% solids. Slurry shell flour and water at 4% solids and blend slurries. Dilute combined slurry with water to 1.5% solids. Add deposition agent and mix 15 minutes. Add defoamer, anti-oxidant, zinc oxide and pre-floc control and mix 5 minutes. Add "Neoprene" latex and mix 5 minutes. Add alum as 2% aqueous solution to adjust pH to 4.5 and to cause flocculation of Neoprene.

Waterlaid sheets were prepared from the above slurry as in Example 1 and pressed at 160° C. for 3.5 minutes at 88 psi (6 kg/cm$^2$) to obtain a leather-like outsole material.

EXAMPLE 12

A leather-like insole material was prepared having the following formulation:

| Ingredient | Parts | Weight Percent of Essential Solids |
|---|---|---|
| Cationic Polyurethane Solids (Example 1) | 50 | 33.4 |
| Pecan Shell Flour | 70 | 46.6 |
| Woodfiber, 14° SR ("Dryden" unbleached Kraft) | 30 | 20.0 |
|  |  | 100% |
| Defoamer ("Nalco" 212) | 2 | (2% by wt. of fiber + filler) |
| Fungicide ("Dowicide" G) | 0.25 | (.5% by wt. of polymer solids) |
| Sulfuric Acid (10%) | sufficient to adjust pH to 4.5 |  |

A slurry for use in preparing a waterlaid sheet was prepared as in Example 2 and a waterlaid sheet prepared therefrom as in Example 4, except that pressing conditions for the sheet were 160° C. for 2 minutes at 62.5 psi (4.2 kg/cm$^2$). A useful, leather-like insole material was obtained.

EXAMPLE 13

A waterlaid, leather-like outsole material was prepared employing glass microspheres as the particulate filler in the following formulation:

| Ingredient | Parts | Weight Percent of Essential Solids |
|---|---|---|
| Anionic Polyurethane Solids (Example 1) | 162.5 | 72.1 |
| Glass Microspheres (B-40-BX, 3M Company) | 36.5 | 16.3 |
| Woodfiber, 14° SR ("Mersanier" J pulp) | 26 | 11.6 |
|  |  | 100% |
| Deposition Agent ("Kymene" 557) | 3.9 | (6.25% by wt. of fiber + filler) |
| Defoamer ("Nalco" 212) | 1.25 | (2% by wt. of fiber + filler) |
| Fungicide ("Dowicide" G) | 0.8 | (.5% by wt. of polymer solids) |
| Sulfuric Acid (10%) | to adjust pH to 4.5 |  |

A slurry of the above formulation was prepared by the procedure of Example 7 and a waterlaid sheet prepared as in Example 1. The sheets were pressed at 160° C. for 4.5 minutes at 91 psi (6.4 kg/cm$^2$). A low density (0.8 g/cm$^3$) leather-like sheet having high internal bond strength was obtained.

EXAMPLE 14

A leather-like outsole material was prepared using asbestos fibers as the reinforcing fiber in the following composition:

| Ingredient | Parts | Weight Percent of Essential Solids |
|---|---|---|
| Anionic Polyurethane Solids (Example 1) | 125 | 55.6 |
| Pecan Shell Flour | 80 | 35.5 |
| Asbestos Fiber (Grade 4T, Asbestos Corporation of America) | 20 | 8.9 |
|  |  | 100% |
| Cationic Deposition Agent ("Kymene" 557) | 3 | (3% by wt. of fiber and filler) |
| Defoamer ("Nalco" 212) | 2 | (2% by wt. of fiber + filler) |
| Fungicide ("Dowicide" G) | .6 | (.5% by wt. of polymer solids) |

Waterlaid sheets were prepared as in Example 1. The sheets were pressed at 160° C. for 5 minutes under 55 psi (3.8 kg/cm$^2$). A leather-like outsole material having good internal bond and low stiffness was obtained.

EXAMPLE 15

A leather-like, waterlaid sheet was prepared using an anionic latex, shell flour and woodfiber without the use of a cationic deposition agent. The following ingredients were combined:

| Ingredient | Parts | Weight Percent of Essential Solids |
|---|---|---|
| Anionic Polyurethane Solids (Example 1) | 125 | 55.6 |
| Pecan Shell Flour | 80 | 35.5 |
| Woodfiber, 14° SR ("Mersanier" J pulp) | 20 | 8.9 |
| | | 100% |
| Defoamer ("Nalco" 212) | 2 | (2% by wt. of fiber + filler) |
| Fungicide ("Dowicide"G) | 0.6 | (.5% by wt. of polymer solids) |
| Aluminum Sulfate | 34 | (about 15% by wt. of total solids to lower pH to 4.5) |

An aqueous slurry was prepared using the following:
*Precipitation Procedure:* Shellflour and woodfiber prepared as in Example 1. The defoamer and fungicide were then added and the slurry mixed 5 minutes. The anionic polymer was diluted with water to 20% solids and added to the slurry with thorough mixing. The aluminum sulfate (alum) is slowly added with rapid agitation to flocculate the polymer.

Waterlaid sheets were prepared as in Example 1, except that no additional cationic flocculant was provided. The sheets were pressed at 160° C. for 4.5 minutes under 55 psi (3.8 kg/cm²). A leather-like sheet suitable for outsole use and having good internal bond strength and low stiffness was obtained.

EXAMPLE 16

A leather-like outsole material was prepared using rayon staple fibers as the reinforcing fiber.

| Ingredient | Parts | Weight Percent of Essential Solids |
|---|---|---|
| Anionic Polyurethane Solids (Example 1) | 125 | 55.6 |
| Pecan Shell Flour | 80 | 35.5 |
| Rayon Staple Fibers, 0.75 denier per filament, ¼" length, bright (American Viscose Corp.) | 20 | 8.9 |
| | | 100% |
| Cationic Deposition Agent ("Kymene" 557) | 3 | (3% by wt. of fiber + filler) |
| Defoamer ("Nalco" 212) | 2 | (2% by wt. of fiber + filler) |
| Fungicide ("Dowicide" G) | 0.6 | (.5% by wt. of polymer solids) |

Waterlaid sheets were prepared as in Example 1. The sheets were pressed at 160° C. for 5 minutes at 90 psi (6.3 kg/cm²). A satisfactory leather-like outsole material was obtained.

EXAMPLE 17

A leather-like outsole material was prepared using nylon tow fibers as the reinforcing fiber component.

| Ingredient | Parts | Weight Percent of Essential Solids |
|---|---|---|
| Anionic Polyurethane Solids (Example 1) | 125 | 55.6 |
| Pecan Shell Flour | 80 | 35.5 |
| Nylon tow fiber, 3 denier per filament, ¼" length | 20 | 8.9 |
| | | 100% |
| Deposition Agent ("Kymene" 557) | 3 | (3% by wt. of fiber + filler) |
| Defoamer ("Nalco" 212) | 2 | (2% by wt. of fiber + filler) |
| Fungicide ("Dowicide" G) | 0.6 | (.5% by wt. of polymer solids) |

Waterlaid sheets were prepared as in Example 1. The sheets were pressed at 160° C. for 5 minutes under a pressure of 58 psi (4 kg/cm²). A leather-like outsole material having a good balance of physical properties was obtained.

EXAMPLE 18

A leather-like sheet was prepared using potato starch as the particulate filler. The following ingredients were combined:

| Ingredient | Parts | Weight Percent of Essential Solids |
|---|---|---|
| Anionic Polyurethane Solids (Example 1) | 125 | 55.6 |
| Potato Starch ("Crown" modified potato starch No. 180, Penick & Ford, Ltd.) | 80 | 35.5 |
| Woodfiber, 14° SR ("Mersanier" J pulp) | 20 | 8.9 |
| | | 100% |
| Deposition Agent ("Kymene" 557) | 3 | (3% by wt. of fiber + filler) |
| Defoamer ("Nalco" 212) | 1 | (1% by wt. of fiber + filler) |
| Fungicide ("Dowicide" G) | 0.6 | (.5% by wt. of polymer solids) |

An aqueous slurry was prepared by the procedure used in Example 7 and waterlaid sheets were made as in Example 1 with the following exceptions:
 a. slurry temperature kept at 25° C. to prevent solubilization of the starch particles;
 b. no pH adjustment with sulfuric acid;
 c. no additional flocculant was used in preparing waterlaid sheets.
The sheets were pressed at 160° C. for 4.5 minutes at a pressure of 39 psi (2.7 kg/cm$^2$). A leather-like sheet suitable for use as an outsole was obtained which had excellent flex properties and low stiffness.

I claim:
1. A leather-like, waterlaid sheet comprising a major amount of essential solids consisting of elastomeric binder and nonelastomeric solids comprising particulate filler and reinforcing fiber, said particulate filler comprising about 10 to 60% by weight of said essential solids, the particles of said particulate filler being inflexible, non-fibrous, rounded particles having an average particle size in the range of about 1 to 160 microns, the length of any major axis of the particles being no more than twice the length of any of the other axes, said reinforcing fiber comprising at least 5% by weight of said essential solids and said elastomeric binder being present in an amount sufficient to provide an integral, cohesive sheet.

2. A sheet according to claim 1 wherein said essential solids comprise at least 75% by weight of the total solids of the sheet.

3. A sheet according to claim 1 wherein said binder is an elastomeric polyurethane binder.

4. A sheet according to claim 1 wherein said particulate filler is vegetable shell flour.

5. A sheet according to claim 4 wherein said vegetable shell flour is selected from the group consisting of pecan shell, walnut shell, coconut shell, peach pit, apricot pit and cherry pit flours and mixtures thereof.

6. A sheet according to claim 4 wherein said vegetable shell flour is almond shell flour.

7. A sheet according to claim 1 wherein said particulate filler is cold-water-insoluble, ungelatinized starch.

8. A sheet according to claim 1 wherein said particulate filler is an inorganic filler.

9. A sheet according to claim 1 wherein said fibrous component is leather fiber and comprises 5 to 50% by weight of said essential solids.

10. A sheet according to claim 1 wherein said fibrous component is wood fiber and comprises 5 to 50% by weight of said essential solids.

11. A leather-like, waterlaid sheet comprising at least 75% by weight of the total solids of essential solids consisting of 15 to 80% by weight elastomeric polyurethane binder, 10 to 60% by weight particulate filler comprising vegetable shell flour and 5 to 50% by weight fibrous reinforcing component selected from the group consisting of wood, leather, rayon, nylon and asbestos fibers.

12. An aqueous slurry for providing a leather-like, waterlaid sheet comprising a major amount of water and slurried solids and having a papermaking consistency, said slurried solids comprising essential solids consisting of 15 to 80% by weight elastomeric binder, 10 to 60% by weight particulate filler, and 5 to 50% by weight fibrous reinforcing component, the particles of said particulate filler being inflexible, non-fibrous, rounded particles having an average particle size in the range of about 1 to 160 microns, the length of any major axis of the particles being no more than twice the length of any of the other axes.

13. An aqueous slurry according to claim 12 wherein said essential solids comprise at least 75% by weight of the total solids of the slurry.

14. An aqueous slurry according to claim 12 wherein said slurried solids comprise 0.5 to 7% by weight of the total slurry.

15. An aqueous slurry according to claim 12 wherein said elastomeric binder is an elastomeric polyurethane binder.

16. An aqueous slurry according to claim 12 wherein said fibrous reinforcing component is selected from the group consisting of wood, leather, rayon, nylon and asbestos fibers.

17. An aqueous slurry according to claim 12 wherein said particulate filler is vegetable shell flour.

18. An aqueous slurry according to claim 17 wherein said vegetable shell flour is selected from the group consisting of pecan shell, walnut shell, coconut shell, peach pit, apricot pit and cherry pit flours and mixtures thereof.

19. An aqueous slurry according to claim 17 wherein said vegetable shell flour is almond shell flour.

20. An aqueous slurry according to claim 12 wherein said particulate filler is cold-water-insoluble, ungelatinized starch.

21. An aqueous slurry according to claim 12 wherein said particulate filler is an inorganic filler.

22. An aqueous slurry according to claim 12 wherein said elastomeric binder is an elastomeric polyurethane, said particulate filler is vegetable shell flour and said fibrous reinforcing component is selected from the group consisting of leather fiber and wood fiber.

23. A method of providing a leather-like, waterlaid sheet comprising
   a. providing an aqueous slurry comprising water and slurried solids and having a papermaking consistency, said slurried solids comprising a major amount of essential solids consisting of 15 to 80% by weight elastomeric binder, 10 to 60% by weight particulate filler, and 5 to 50% by weight fibrous reinforcing component, the particles of said particulate filler being inflexible, non-fibrous, rounded particles having an average particle size in the range of about 1 to 160 microns, the length of any major axis of the particles being no more than twice the length of any of the other axes,
   b. depositing said slurry on a supporting surface,
   c. removing water from the deposited slurry to form a coherent sheet,
   d. drying said sheet to provide a leather-like sheet.

24. A method of providing a leather-like sheet according to claim 23 comprising the additional steps of
   e. heating the sheet obtained from step (d) at an elevated temperature for a time sufficient to cause flow of said elastomeric binder,
   f. discontinuing said heating prior to flowing together of said elastomeric binder into a continuous phase, whereby a sheet having increased tensile strength over that resulting from step (d) is produced.

25. A leather-like, waterlaid sheet according to claim 1 which is free of leather fibers.

26. An aqueous slurry according to claim 12 which is free of leather fibers.

* * * * *

UNITED STATES PATENT AND TRADEMARK OFFICE
CERTIFICATE OF CORRECTION

PATENT NO. : 4,011,130
DATED : March 8, 1977
INVENTOR(S) : Robert A. Worden

It is certified that error appears in the above-identified patent and that said Letters Patent are hereby corrected as shown below:

Column 1, line 32, delete "a" before "U.S. Pat.";

Column 11, line 50, after "shoe" change "sale" to -- sole -- ;

Column 17, lines 62-63, delete "the" at the end of line 62, and in line 63 insert -- I -- after "Table" so it reads -- shown in Table I below -- ;

Column 25, line 3, insert quotation marks around -- "Neoprene" -- ;

Column 28, line 52, (in the 5th line of the table under the first column headed "Ingredient", insert -- 1/4 -- before the symbol for inch, so the line reads -- filament, 1/4" length -- ;

Column 30, line 28, delete "a major amount of", and line 30, after "comprising" insert -- a major amount of -- .

Signed and Sealed this

Seventh Day of March 1978

[SEAL]

Attest:

RUTH C. MASON
Attesting Officer

LUTRELLE F. PARKER
Acting Commissioner of Patents and Trademarks